United States Patent [19]

Yoshida

[11] Patent Number: 5,046,263
[45] Date of Patent: Sep. 10, 1991

[54] OIL LEVEL MONITORING DEVICE FOR AUTOMOTIVE AUTOMATIC POWER TRANSMISSION

[75] Inventor: Toshiyasu Yoshida, Shizuoka, Japan

[73] Assignee: Jatco Corporation, Fuji, Japan

[21] Appl. No.: 558,343

[22] Filed: Jul. 27, 1990

[30] Foreign Application Priority Data

Jul. 27, 1989 [JP] Japan ............................ 1-87495[U]

[51] Int. Cl.$^5$ ............................................ G01F 23/04
[52] U.S. Cl. ........................................ 33/722; 33/730; 184/108; 74/473 R; 192/4 A
[58] Field of Search ............... 33/722, 723, 724, 725, 33/726, 727, 728, 729, 730, 731; 340/450, 450.3; 74/DIG. 7; 184/108; 116/109, 227

[56] References Cited

U.S. PATENT DOCUMENTS

| | | | |
|---|---|---|---|
| 1,419,012 | 6/1922 | Brunner | 33/730 |
| 2,551,770 | 5/1951 | Smith | 33/722 |
| 2,757,647 | 8/1956 | Kishline | 33/731 |
| 2,937,449 | 5/1960 | Bade | 33/727 |
| 2,953,939 | 9/1960 | Rains | 33/727 |
| 4,055,898 | 11/1977 | Braun et al. | 33/729 |

FOREIGN PATENT DOCUMENTS 54-45878 9/1977 Japan.
0290409 5/1928 United Kingdom ................ 33/722

Primary Examiner—Thomas B. Will
Attorney, Agent, or Firm—Foley & Lardner

[57] ABSTRACT

An oil level monitoring device including a transfer shaft for selecting an operational mode of an automatic power transmission by movement of a selector lever. The hollow cylindrical transfer shaft extends essentially in a vertical direction for permitting an oil level gauge inserted therethrough to reach a lubricant oil in a reservoir. The oil level gauge is ordinarily contained within the shaft.

4 Claims, 1 Drawing Sheet

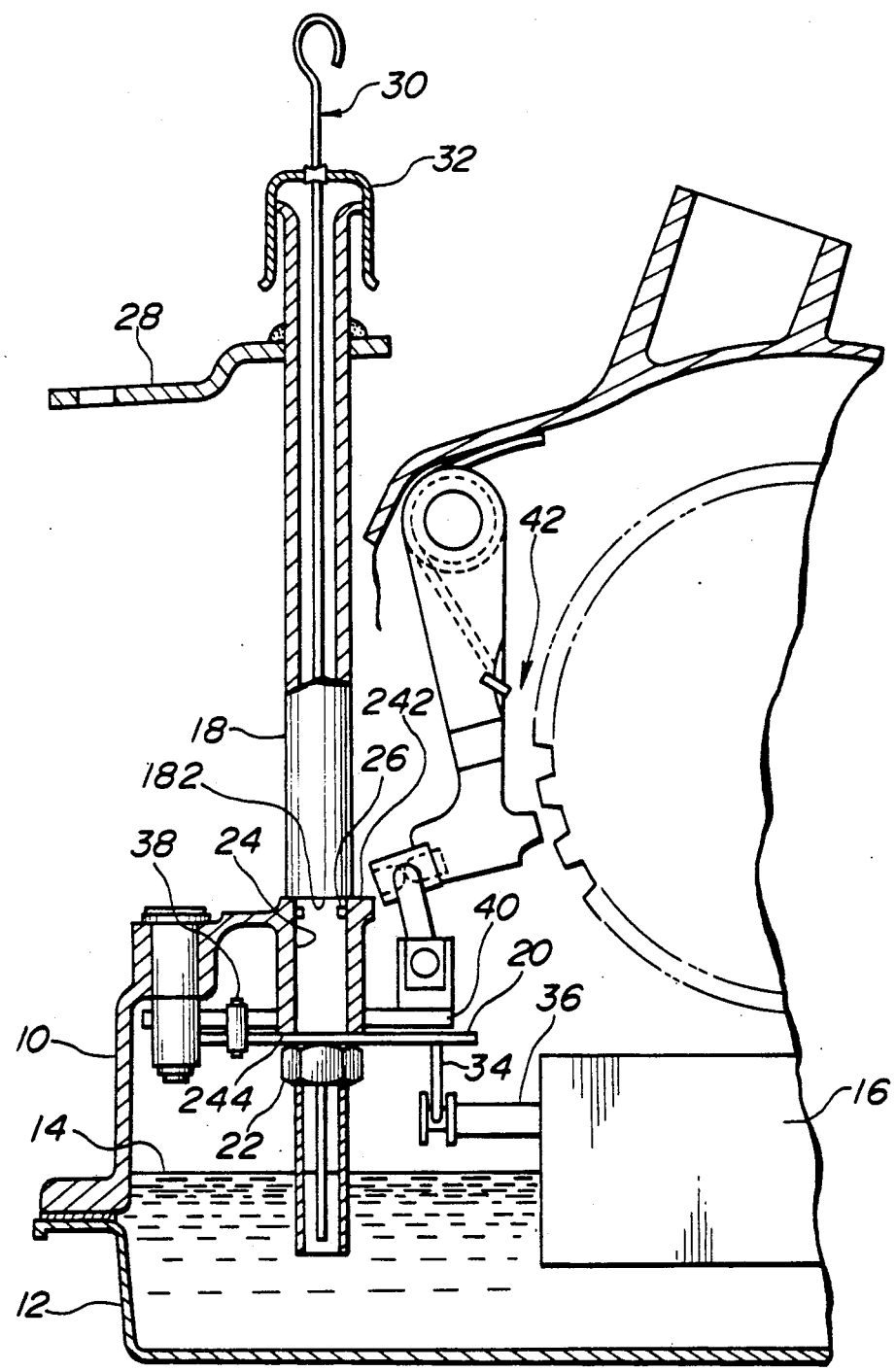

100010006600010020000000000000000000000000000000000000000000000000000000000000000000000000000000000000000000000000000000000000000000000000000000000000000000000000000000000000000000000000000000000000000000000000000000# OIL LEVEL MONITORING DEVICE FOR AUTOMOTIVE AUTOMATIC POWER TRANSMISSION

BACKGROUND OF THE INVENTION

1. Field of the Invention

The present invention relates generally to an oil level monitoring device for an automatic power transmission in an automotive vehicle.

2. Description of the Background Art

One example of a conventional oil level monitoring device for an automatic power transmission is disclosed in Japanese Utility Model First (unexamined) Publication (Jikkai) Showa 54-45878. The device generally comprises an oil filler tube extending from a transmission casing, and an oil level gauge insertable into the oil filler tube. The oil filler tube extends in an essentially vertical direction, to place the lower end thereof in the vicinity of a lubricant oil level of a reservoir. The oil gauge passes through the oil filler tube so that the lower end portion thereof may reach, and is dipped into, a lubricant oil reservoir. The checking of oil level is performed by pulling out the oil level gauge from the oil filler tube and by checking oil residing on the lower end of the oil level gauge.

As can be appreciated, in such a conventional oil level monitoring device, it is essential to provide an oil filler tube so as to permit the oil level gauge to access the lubricant oil in the reservoir. Therefore, space for installation of the oil filler tube becomes necessary. Such necessity sometimes reduces freedom in designing the transmission casing and bars reduction of size of the overall construction of the automatic power transmission.

On the other hand, in the modern automotive automatic power transmission, one of the most important tasks is reducing the unit size and overall weight. For this, the presence of the oil filler tube becomes an interfering factor in designing a reduced size automatic power transmission. Furthermore, providing the oil filler tube necessarily requires extra parts and assembling processes, with higher production costs.

SUMMARY OF THE INVENTION

Therefore, it is an object of the present invention to provide an oil level monitoring device which does not require an oil filler tube for permitting an oil level gauge to access lubricant oil in a reservoir.

In order to accomplish aforementioned and other objects, an oil level monitoring device, according to the present invention, utilizes a transfer shaft for transmitting selector input for selecting the operational mode of an automatic power transmission through a selector lever. For this, the transfer shaft is formed of a hollow cylindrical construction, and extends essentially in a vertical direction for permitting an oil level gauge inserted therethrough to reach a lubricant oil in a reservoir.

According to one aspect of the invention, an oil level monitoring device for an automatic power transmission for an automotive vehicle, comprises:

a transmission casing housing having therein an automatic power transmission mechanism;

a vertically extending conduit means incorporated with a vertically extending component of a transmission operational mode selecting mechanism, for defining an essentially vertical conduit; and an oil level gauge inserted through the conduit defined by the essentially vertical conduit for dipping the lower end therein in a lubricant oil.

The vertically extending component may be a transfer shaft associated with a manual operable selector for selecting an operational mode of the automatic power transmission, and the vertically extending conduit means comprises an axially extending conduit formed through the transfer shaft. The transfer shaft may be rotatably disposed within the transfer casing and has an upper end portion extending from the transmission casing. The axially extending conduit opens to the upper end of the transfer shaft oriented outside of the transmission casing. The oil level gauge is provided with a closure cap for closing the upper end of the conduit.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment or embodiments, but are for explanation and understanding only.

The sole drawing shows a section of the major part of an automatic power transmission for an automotive vehicle, to which the preferred embodiment of an oil level monitoring apparatus, according to the present invention, is applied.

DESCRIPTION OF THE PREFERRED EMBODIMENT

Referring now to the drawing, a transmission casing 10 is asembled with a lubricant oil reservoir 12 filled with a lubricant oil 14. A control valve 16 is disposed in the transmission casing 10. The transmission casing 10 is formed with an essentially vertical through opening 24. A hollow cylindrical transfer shaft 18 extends through the through opening 24 in the transmission casing 10. The transfer shaft 18 has a stepped shoulder 182 contacting with the upper end face 242 of the through opening 24.

A link plate 20 is attached to the lower smaller diameter section of the transfer shaft 18. In the assembled position, the link plate 20 mates with the lower end face 244 of the through opening. The link plate 20 is secured in the position shown by a fastening nut 22 which is threadingly engaged with the lower end portion of the transfer shaft 18. The tightening torque of the fastening nut 22 is selected so as not to prevent smooth rotation of the transfer shaft 18 with carrying the link plate 20.

In order to establish liquid tight seal between the outer periphery of the transfer shaft 18 and the inner periphery of the through opening 24, a seal ring 26 is disposed therebetween.

The transfer shaft 18 is rigidly connected to a transfer lever 28 by way of welding at the portion extended outside of the transmission casing 10. The transfer lever 28 is connected to a manually operable selector lever (not shown) in a per se known manner, for manual operation for selecting one of a plurality of transmission operational modes.

The transfer lever 28 thus constructed defines an oil level gauge receptacle conduit for receiving therethrough an oil level gauge 30 for dipping the lower end thereof into the lubricant oil in the reservoir 12. A closure cap 32 is fixed on the oil level gauge 30 for closing the upper end opening of the transfer lever 28.

The link plate 20 is connected to a manual valve 36 of the control valve 16 via a connecting pin 34. Since the link plate 20 is pivotally driven by the transfer shaft 18, the manual valve 36 is operated to cause axial shifting over a plurality of positions respectively corresponding to a plurality of the operational mode of the automatic power transmission. Furthermore, the link plate 20 is connected to a parking mechanism 42 which is of per se known construction and adapted to establish locking of the transmission gear assembly for preventing forward and reverse driving of the automatic power transmission, via a pin 38 and a plate 40.

With the shown construction, in response to manual operation of the selector lever, the transfer lever 28 is pivotally driven about the axis of the transfer shaft 18. Accordingly, the transfer shaft 18 is driven rotatingly for causing pivotal movement of the link plate 20. By pivotal movement of the link plate 20, the manual valve 36 is axially driven to the position corresponding to selected one of the transmission operational modes. With the action set forth above, the operational modes of the automatic power transmission is selected among a plurality modes, such as N (neutral) range mode, D (automatic speed ratio selection drive) mode range, L (low gear hold) range mode and so forth. When the selector lever is manually operated into P (parking) range mode position, the parking mechanism 42 becomes active to establish park locking of the transmission gear assembly.

Upon checking lubricant oil level and/or condition, the oil level gauge 30 is pulled out of the transfer shaft 18 just in the same manner in the prior art. Furthermore, as can be appreciated, re-filling or adding of lubricant oil can be done through the transfer shaft 18. Therefore, the shown embodiment of the oil level monitoring device, according to the present invention does not require an oil filler tube.

As can be appreciated, by neglecting of the oil filler tube, freedom in designing of the transmission casing can be significantly expanded. Therefore, satisfactory reduction of the overall size of the automatic power transmission can be achieved. Furthermore, since neglecting of the oil filler tube naturally reduces number of parts to be assembled. Reduction of production cost can be expected.

While the present invention has been discussed in detail in terms of the preferred embodiment of the invention, the foregoing discussion concerning the preferred embodiment is to be regarded merely for facilitating better understanding of the invention and not intended to specify the invention to the specific embodiment. Therefore, the invention should be understood to incorporate all possible embodiments and modifications thereof which can be embodied without departing from the principle of the invention, which principle has been clearly defined in the appended claims.

What is claimed is:

1. An oil level monitoring device for an automatic power transmission in an automotive vehicle, comprising:
    a transmission casing;
    an automatic power transmission mechanism housed within said casing;
    an essentially vertically extending conduit means forming a component of a transmission operational mode selecting mechanism and further defining an essentially vertical conduit for receiving an oil level gauge; and
    an oil level gauge insertable through said conduit for dipping the lower end therein in a lubricant oil.

2. An oil level monitoring device as set forth in claim 1, wherein said vertically extending component is a transfer shaft associated with a manual operable selector for selecting operational mode of the automatic power transmission, and said vertically extending conduit means comprises an axially extending conduit formed through said transfer shaft.

3. An oil level monitoring device as set forth in claim 2, wherein said transfer shaft is rotatably disposed within said transmission casing and has an upper end portion extending from said transmission casing.

4. An oil level monitoring device as set forth in claim 3, wherein said axially extending conduit opens at the upper end of said transfer shaft located outside of said transmission casing, said oil level gauge being provided with a closure cap for closing the upper end of said conduit.

* * * * *